July 20, 1965
H. HANSEN
3,195,668
DRAFT APPLIANCE
Filed July 30, 1962
3 Sheets-Sheet 2
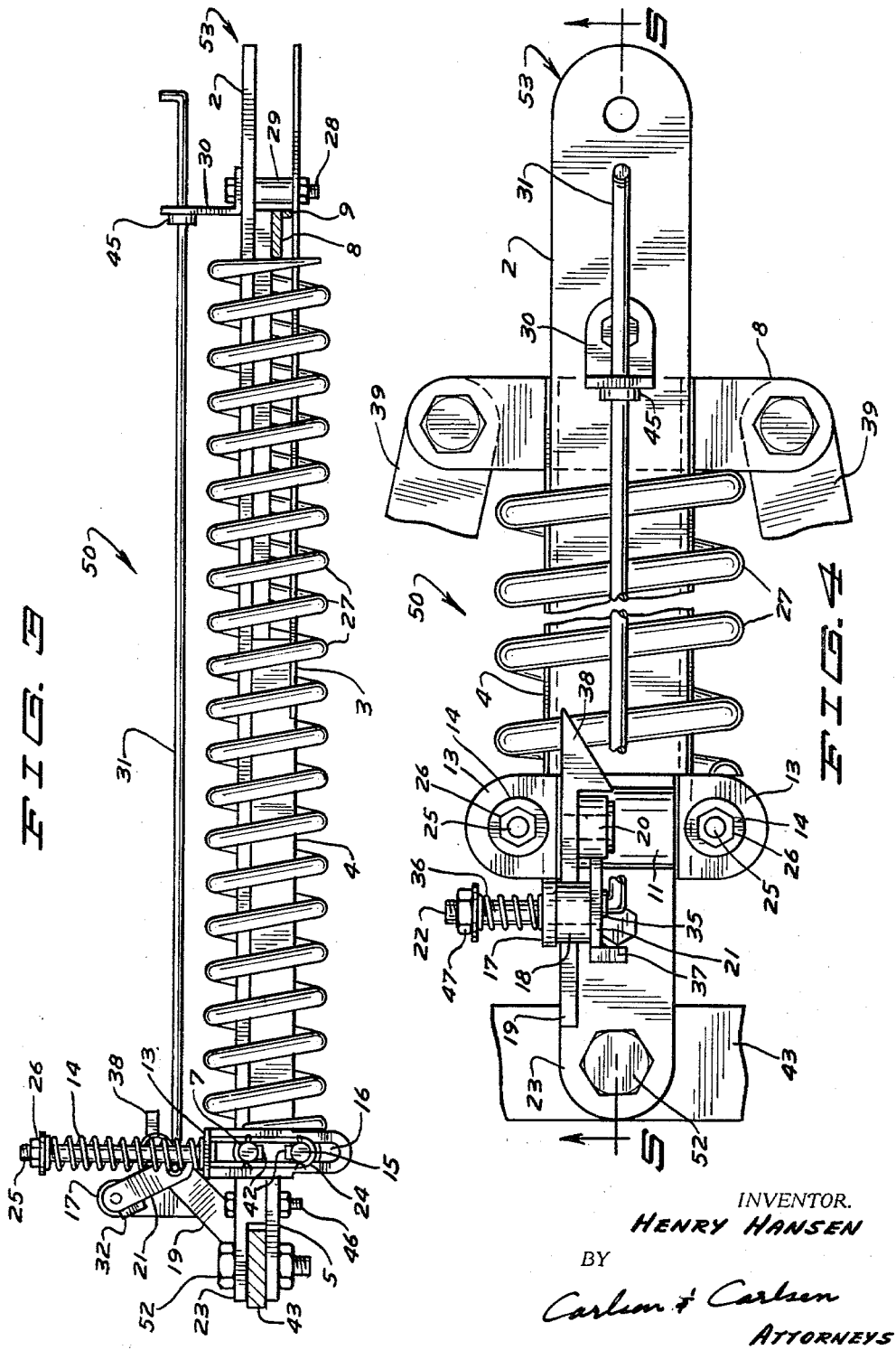
INVENTOR.
HENRY HANSEN
BY
Carlsen & Carlsen
ATTORNEYS

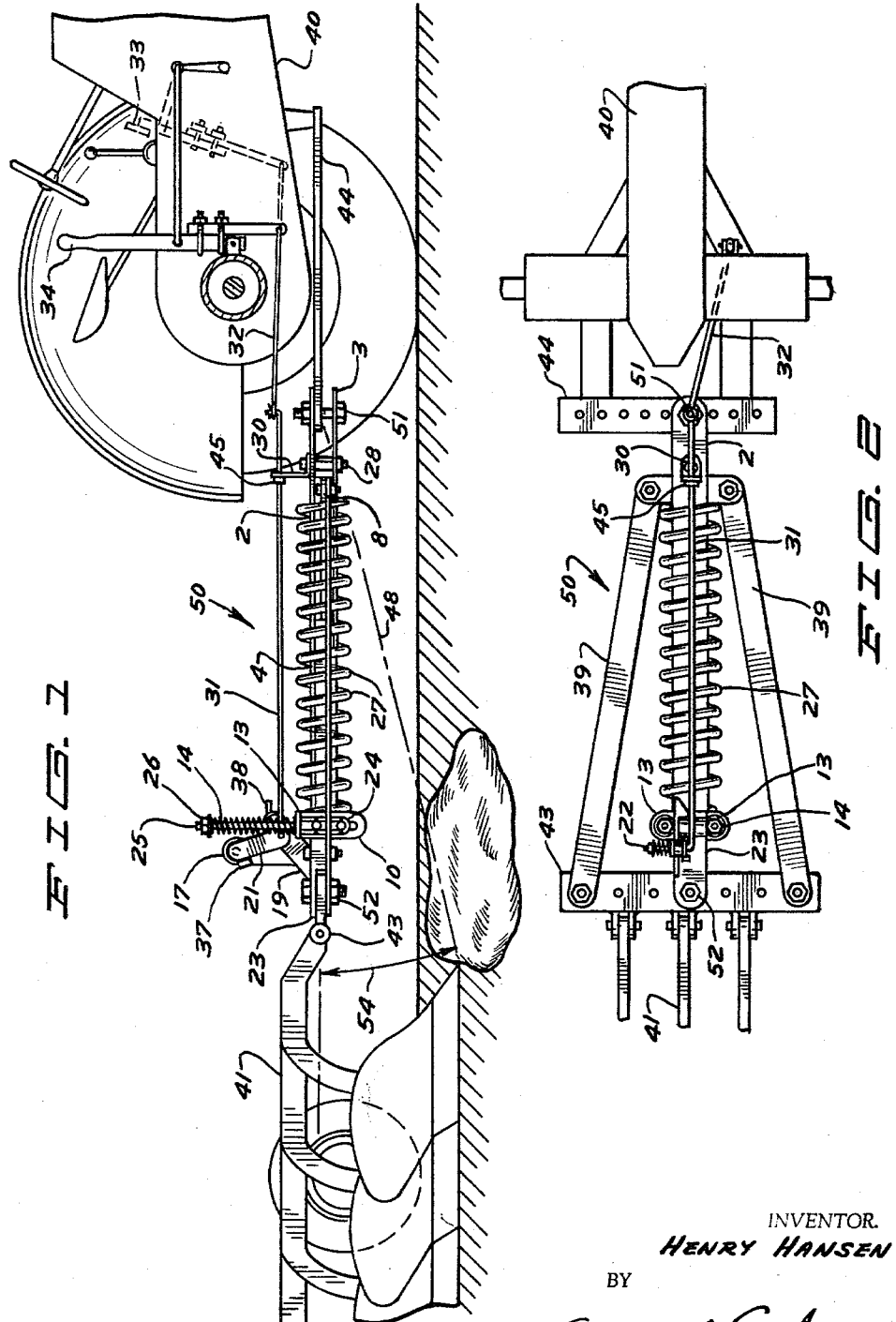

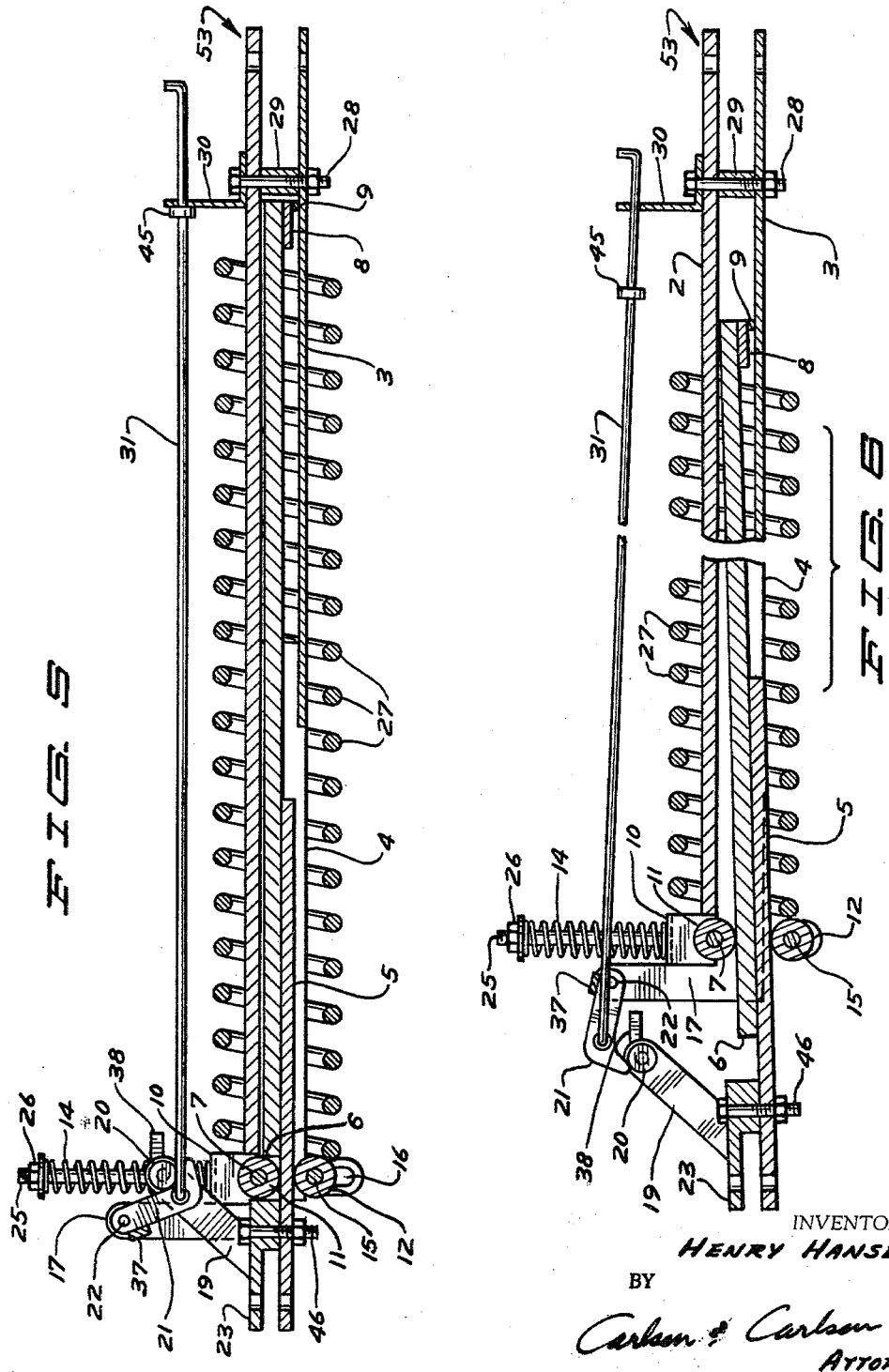

United States Patent Office 3,195,668
Patented July 20, 1965

3,195,668
DRAFT APPLIANCE
Henry Hansen, Rte. 3, Aberdeen, S. Dak.
Filed July 30, 1962, Ser. No. 213,399
5 Claims. (Cl. 180—14.5)

This invention relates generally to draft appliances for use with earth working equipment and is more particularly directed to automatically operated protective draft appliances.

The application of my invention to equipment utilized in earth working provides increased efficiency of operation and reduced wear on a draft producing means, such as a vehicle, and the instrumentality utilized to perform an operation on or in the earth over which it is drawn. The prior art contains many examples of draft appliances which are intended to increase efficiency and reduce wear and tear on the equipment with which they are utilized. In general, such prior art appliances included a load responsive release mechanism, such as a "Holland" or "box car hitch," to disconnect the source of draft power, such as a tractor, from the earth working instrumentality, such as a plow. Further means were provided to disengage the power plant on the tractor from the driving mechanism after such release or separation occurred so as to stop the tractor. Upon such separation and stopping of the tractor, the operator was then required to back the tractor into a position in proximity with the earth working instrumentality and then manually recouple the tractor to the earth working instrumentality through the draft appliance. Of course, the disengagement of the power source on the tractor from the driving mechanism required the operator to perform an operation in this regard so that the tractor might be backed up to the earth working instrumentality. It may also be noted that prior art apparatus contains various forms of cushioning arrangements in which a spring has been utilized to reduce the shock to the draft appliance, the tractor and implement when an obstruction was encountered.

In the present era, wherein maximum use of equipment in combination with a trouble-free and long useful life is desired, the elements of dependability, reliability, ease and efficiency of operation and economical construction are all important. In my invention, the unpredictable element of friction has been substantially eliminated from the operation of the draft appliance in performing its stated purpose. Further, the shock which invariably accompanies the encountering of an obstacle to forward motion is substantially reduced to remove the possibility of harm either to the implement or to the tractive means. Since friction has been substantially eliminated, the device will operate to release the direct draft transmitting connection to the implement at the predetermined load for which it may be adjusted. It may also be noted that loads encountered in earth of a certain character may present draft loads which may be tolerated by the earth working equipment when a steady load is exerted but that transient loads, due to substantially immovable obstacles, may cause severe damage to the implement or the tractive means. The present invention is responsive to such obstacles to automatically respond to such transient loads because the release mechanism is responsive to the line of draft, or effective applied load, to release the direct draft connection at forces of a lower magnitude than that required for a draft load along the longitudinal axis of the appliance. This, of course, then allows the appliance to be adjusted to release at a fairly high draft load for substantially constant loads exerting a force substantially along the longitudinal axis thereof so that only true obstacles likely to damage the equipment are likely to result in effective operation of the appliance. This provides for fewer operations of the draft appliance with an attendant increase in the overall total productive time of the equipment. Another important contribution to the overall utilization of the equipment is the recoupling feature effected through the combination of the drive disconnecting feature of my invention and the energy absorbing biasing means which serves to automatically re-engage the direct draft connection to the implement. This is done by physically pulling the implement and the tractor together to a position wherein the release means again becomes engaged to provide the direct draft connection. In many situations, it will be found that the impact has served to loosen the obstacle to the point where the equipment may again proceed in a forward direction. In other circumstances, it may be necessary to remove the obstacle or lift the implement over the obstacle to allow for continuing operation.

Another feature of my invention provides adequate energy absorbing means which may be operative upon release of the direct draft connection to safely and gradually bring the tractor to a stop even under high speed conditions of operation without damaging the implement and will provide sufficient energy to move the tractor and implement into a recoupling position. It will also be noted that the means for disconnecting the source of power from the driving means on the tractor is maintained in a position as to prevent re-application of such power until recoupling has been effected to provide a truly automatic operation.

It is therefore an object of the present invention to provide a novel improved draft appliance.

It is another object of this invention to provide a draft appliance having improved efficiency of operation.

It is another object of this invention to provide a draft appliance which is responsive to draft loads of varying magnitudes and direction to automatically release a direct draft connection between a source of power and an implement.

Another object of the present invention is to provide a draft appliance which automatically disengages and re-engages a draft connection between a source of draft power and an implement.

It is another object of this invention to provide a draft appliance responsive to excessive draft loads to automatically disengage a draft connection and stop a source of motive power for an implement and thereafter to re-engage the draft connection and re-engage the source of power.

A further object of this invention is to provide an improved mechanism for de-energizing a source of power upon disengagement of a draft connection to an implement.

A still further object of the present invention is to provide a draft appliance including all of the above objects that is uncomplicated in construction and may be economically produced.

These and other objects of my invention will become apparent from a consideration of the appended specification, claims and drawings, in which—

FIG. 1 is a side elevational view of a preferred embodiment of my invention shown in operative position between an earth working instrumentality and a source of draft power.

FIG. 2 is a top view of the apparatus of FIG. 1.

FIG. 3 is an enlarged side elevational view of the draft appliance of FIG. 1.

FIG. 4 is an enlarged top view of the embodiment of FIG. 3.

FIGS. 5 and 6 are sectional side views of my apparatus shown in engaged and disengaged positions taken along center line 5—5 of FIG. 4.

Referring now to the drawings in which like reference characters have been applied to like elements, and an earth working instrumentality, 41, shown in the form of multiple gang plow is connected to a conventional farm type tractor 40 through a draft appliance indicated generally by the reference character 50. Tractor 40 includes a source of power, a means for connecting the source of power to a driving train and means for connecting the driving train to the wheels thereof. These last named devices are found on any of a number of conventional tractors any of which might also include a hand lever 34 or a foot pedal 33 or both, for connecting and disconnecting the source of power to the drive train. Clutch operators 33 and 34 (shown in dotted outline) may be operatively connected to a power disengaging member on draft appliance 50 through suitable connecting means 32, shown in the form of a rod-like member of suitable length and mechanical characteristics to transmit forces for operating the clutch controlling members in accordance with the operation of the draft appliance 50. A drawbar 44 is rigidly attached to the frame of tractor 40 and serves to transmit the draft force to the forward end of draft appliance 50.

In the illustrated embodiment, draft appliance 50 includes a pair of longitudinally elongated members which are reciprocally movable with respect to one another. One of these, a frame member is comprised of a horizontally oriented bar 2 which extends substantially the length of draft appliance 50 to which is rigidly attached a second flat horizontally extending member 3 which extends approximately to the mid point of member 2. A pair of vertically oriented flat side plates 4 are attached, as by welding, to the rear one-half of member 2 and to the rear portion of member 3. The forward end of members 2 and 3 are rigidly connected by bolt 28 and spacer member 29 which is of suitable dimension so as to provide substantially parallel alignment of members 2 and 3. A second longitudinally elongated member 5 is reciprocally positioned within the housing defined by the members described above. Member 5 includes a cross member 8 attached, as by welding, at its forward end and extending outwardly of the first frame member for purposes to be explained below. A semi-circular anti-friction member 9 depends downwardly from a portion of cross member 8 and may freely move on the top surface of member 3. At the rear portion of member 5 is a notch having a surface 6 for coaction with the load responsive release mechanism to be described below. A clevis 23 is attached through fastening means, or bolt, 46 to the rearwardly extending portion of member 5. Clevis 23 may be of suitable size and configuration for attachment to an earth working instrumentality. In FIG. 2, for example, a transverse member 43 is attached to clevis 23 through fastening means 52. The draft connection may then be made to a plurality of earth working instrumentalities such as the ganged plow frame on earth working instrumentality 41. The relative position of transverse member 43 may be maintained through the use of suitable bracing members 39 connected between transverse member 43 and cross member 8 on sliding member 5. A second clevis arrangement 53 is provided at the forward end of the first frame member and is suitable for engagement with the drawbar 44 on tractor 40. As shown, it may be fastened thereto by means of a bolt member 51.

A pair of vertical members 10 are attached, as by welding, at the rear end of side members 4 and extend vertically upwardly therefrom. A horizontal member 13 is positioned thereacross and has a pair of holes as shown in the top view of FIGS. 2 and 4. A pin 7 upon which is rotatably mounted an upper roller 11 extends through upright members 10 in which it is fixedly held. The lower portions of upright members 10 are provided with an elongated opening through which is movably mounted for reciprocal motion in a vertical direction, a pin 15 upon which is mounted a lower roller 12. Pin 15 and lower roller 12 are vertically movable with respect to pin 7 and upper roller 11. Pin 15 rests on the lower ends of U-shaped bolt members 24, each having an upward vertically extending section 25 which is slidably mounted in the holes in horizontal cross member 13. A pair of compression springs 14 are mounted on the upwardly extending portions 25 of bolts 24 and may be adjusted by suitably positioning nut 26 threaded on the upward end of portion 25 of bolt 24, as to vary the force between upper roller 10 and lower roller 12. Vertical members 10 also serve as a stop for compression spring 27 which is positioned intermediate the vertical members 10 and cross member 8 on member 5 so as to provide a force tending to bias the frame member and sliding member 5, in the absence of a draft load above a predetermined magnitude, to a position of engagement with the release apparatus and direct draft connection between forward clevis 53 and rear clevis 23. It may also be noted that upper roller 11 is positioned within the notch at the rearward end of member 5 and is in engagement with the surface 6 provided at the front end of the notch.

A further vertically extending member 17, having a sleeve 18, is also attached, as by welding, to the rear end of the frame. A rotatable arm 21 having a lateral extension 37 is mounted on pin 22 which extends through an opening in sleeve 18 and upright member 17. Pin 22 is biased by the action of spring means 36 which may be adjusted in compressive force through suitable positioning of the nut 47 on the threaded end of pin 22. It may thus be seen that arm 21 may rotate and may also move in a horizontal direction subject to the biasing force of spring 36. A clutch operating connecting means 31 is connected to arm 21 in proximity to its outward extremity and extends forwardly of the draft appliance 50 through an upright 30 mounted on the frame and is provided with a stop member 45 to limit the forward motion thereof. A further diagonally extending upright member 19 is fastened, as by welding, to the rear end of member 5 and includes a wedge shaped forwardly extending member 38 and a roller 20 rotatably mounted at its upper end. Roller 20 is adapted to engage the forward edge of arm 21 to rotate arm 21. Wedge 38 is utilized to engage the side of arm 21 and move it in a generally horizontal direction so as to allow relative movement between the frame and member 5.

*Operation*

In operation, draft appliance 50 is connected as shown in FIG. 1 intermediate a tractor and an earth working instrumentality. Suitable adjustment of adjusting nuts 26 on portions 25 of U-shaped bolts 24 determines the magnitude of draft load along the longitudinal axis of draft appliance 50 which will result in disengagement of the direct draft connection between the earth working instrumentality and the tractor. When in the position of direct draft engagement, the apparatus is as shown in FIG. 5. The clutch controlling mechanism is in its forwardly extended position and upper stationary roller 11 is positioned in the notch at the rearward end of member 5. When the earth working instrumentality encounters an obstacle which imposes a draft load exceeding the magnitude for which draft appliance 50 is adjusted, a downward force produced by the coaction between upper stationary roller 11 and surface 6 on member 5 serves to move lower movable roller 15 in a downward direction to release, or disengage, member 5 which moves in a rearward direction against the energy absorption characteristics of compression spring 27. Substantially concurrent with the disengagement of member 5 from the direct draft connection, roller 20 on diagonally upwardly extending member 19 engages the edge of arm 21 and rotates it in a clockwise direction. Rotation of arm 21 to the position shown in FIG. 6, namely that of an overcenter position for member 31 with respect to the pin 22 brings member 31 into engagement with stop member 37 on arm 21 and the member 31 is maintained in a rearward clutch disengaging position while member 5 is free to move rearwardly to the extent of its travel as determined by the characteristics and dimensions of spring member 27. As might be determined by one skilled in the art after a thorough consideration of my invention, the characteristics of spring member 27 are such as to bring the tractor to a cushioned stop. After the tractor has stopped, spring member 27 exerts a force tending to move tractor 40 and frame member 2 rearwardly into frame member 5 and into the position shown in FIG. 5, that of a direct draft connection. This may be described as a recoupling action which is automatically achieved independently of the action of the operator of the equipment.

In FIG. 1 a representation of a line of draft, or force 48 is shown at an angle 54 with respect to the longitudinal axis of draft appliance 50. The application of the draft force at an angle to the longitudinl axis of the draft appliance serves to exert a downward force on lower movable roller 12 whereby the magnitude of the force necessary to disengage member 5 is substantially less than required for the above noted operation. This reduction in the magnitude of force necesary to disengage the notch of the rear end of member 5 exists because of the transient downward component of force found to occur under observed operation in agricultural use, when an earth working instrumentality such as a plow encounters an obstacle. The draft appliance may therefore be adjusted to maintain a direct draft connection under severe working conditions in a substantially homogenous terrain to provide a large direct draft force and still provides an adequate margin of safety when an obstacle is encountered that produces a draft force at an angle, as in the illustrated embodiment, in a downwardly extending direction. This tends to materially reduce the number of times that draft appliance 50 must be operative to adequately protect the earth working equipment to thereby contribute materially to the overall efficiency of operation. It may also be noted that draft appliance 50 is substantially free from the undesirable effects of friction between operating portions which provides a reliability and repeatability not found in present forms of the class of draft appliances with which my invention is concerned.

In the disengaged position of draft appliance 50, the clutch controlling member 31, as shown in FIG. 6, may be held in the clutch disengaging position by the action of the spring normally found on foot clutch 33 in FIG. 1. The operator may release arm 21 from the tripped position of FIG. 6 by further depressing the clutch pedal and arm 21 will fall to a substantially vertical position in which it will not interfere with the normal operation of the clutch. In many of the hand lever type of clutches, as illustrated by reference character 34 in FIG. 1, there is no spring action. Arm 21 will immediately fall to a vertical position after roller 20 carried by diagonally extending upright member 19 on member 5 passes thereunder. Upon recoupling, the wedge shaped member 38 at the forward upward end of upright member 19 as shown in FIG. 4, will engage the side of arm 21 moving it in a horizontal direction against the biasing force of spring 36. This allows roller 20 to move to its normal position forwardly of arm 20 when draft appliance 50 is in direct draft transmitting connection.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A load responsive draft appliance comprising in combination;

a longitudinally extending frame member adapted for connection to a vehicular source of motive power;

a second frame member having a transversely disposed notch and being reciprocally mounted within said longitudinally extending frame member and being movable laterally with respect to said frame member;

longitudinally disposed, concentrically mounted biasing means for maintaining said frame members in a first draft transmitting position; and line of draft responsive release means mounted on one of said frame members and in draft transmitting engagement with said second frame member when said frame members are in said first relative position, said release means including a first roller stationarily disposed on said frame member for releasable engagement with the notch in said second frame member and a second roller, including laterally disposed biasing means therefore, said second roller being disposed to resiliently engage said second frame member and being responsive to the direction of the draft loads applied to said appliance to release said second frame member at varying draft loads in accordance with the direction of said loads.

2. Apparatus for connecting a vehicle to an earth engaging implement comprising, in combination;

a pair of frame members, each having connecting means at one extremity for connection to a vehicle and an earth engaging implement respectively, said frame members being reciprocally and laterally movable with respect to one another;

a spring member mounted coaxially of said frame members, said spring member tending to maintain said frame members in a first position;

load responsive release means mounted on one of said frame members and in motion restricting engagement with the other of said frame members, said release means including a stationary roller means and a movable roller means and means biasing said movable roller means toward said stationary roller means, said release means being operative too allow relative motion between said frame members when a predetermined draft load is exceeded along an axis parallel to the longitudinal axis of said frame members and operative to allow relative motion between said frame members at a lower draft load along an axis not parallel to said longitudinal axis; and clutch releasing means operable in response to relative movement between said frame members for controlling the operation of said vehicle.

3. A safety hitch for connecting draft producing apparatus to a source of motive power comprising, in combination;

an elongated frame means including means for connecting the same to a source of motive power at the forward end thereof;

further frame means journalled in said frame means for reciprocating motion, said further frame means including means at the rearward end thereof for connection to a draft producing implement, said further frame means having a transverse notch in the top of said rearward end and lateral extensions at the forward end;

load responsive release means mounted in proximity to the rearward end of said frame, said release means including a stationarily disposed roller in engagement with the transverse notch in said means and a laterally movable roller in engagement with the lower surface of said further frame means and biasing means on said movable roller tending to maintain said movable roller in engagement with said further frame means whereby said release means is operable to release said further frame means at predetermined loads dependent upon the direction thereof with respect to the longitudinal axis of said frame means; and resilient energy dissipating means mounted intermediate the lateral extension on said further frame means and the rearward end of said frame means.

4. Apparatus for releasably attaching draft producing equipment to a vehicle comprising in combination; a first longitudinally extending member having coupling means for attachment to a vehicle at one end and a pair of laterally positioned rollers at the other end, one of said rollers being stationarily disposed on said member and the other of said rollers being resiliently biased toward the other along an axis transverse to the longitudinal axis of said first member; a second longitudinally extending member having means at one end for attachment to a draft producing device and a transversely extending notch on its top surface in proximity to said last named end for receiving said stationary roller on said first member; and means mounting said first and second members in reciprocating slidable and laterally movable relationship so that longitudinal reciprocating motion therebetween will separate said rollers for a predetermined draft load, and draft loads applied to said second member other than longitudinally to said members will cause lateral movement of the end of said second member in proximity to said notch to release said second member before said predetermined draft load is attained.

5. The apparatus of claim 4 in which the lateral movement of the end of the second member is in a direction downwardly away from the first member and toward the component of draft force extending non-parallel to the longitudinal axis of the first and second members.

References Cited by the Examiner
UNITED STATES PATENTS

| | | | |
|---|---|---|---|
| 1,305,651 | 6/19 | Kaiser | 180—14.5 |
| 1,322,661 | 11/19 | Wagner | 180—14.5 |
| 2,250,317 | 7/41 | Vutz | 280—450 |
| 2,701,510 | 2/55 | Altgelt | 280—450 |
| 2,808,119 | 10/57 | Steinman | 180—14.5 |

FOREIGN PATENTS 343,695  2/60  Switzerland.

BENJAMIN HERSH, *Primary Examiner.*

LEO FRIAGLIA, A. HARRY LEVY, *Examiners.*